US00RE45674E

(19) United States
(12) Reissued Patent
Evans

(10) Patent Number: US RE45,674 E
(45) Date of Reissued Patent: Sep. 29, 2015

(54) DOG HARNESS

(71) Applicant: Alecia B. Evans, Basalt, CO (US)

(72) Inventor: Alecia B. Evans, Basalt, CO (US)

(21) Appl. No.: 29/479,598

(22) Filed: Jan. 17, 2014

Related U.S. Patent Documents

Reissue of:
(64) Patent No.: Des. 652,581
Issued: Jan. 17, 2012
Appl. No.: 29/389,726
Filed: Apr. 15, 2011

U.S. Applications:
(62) Division of application No. 29/367,234, filed on Aug. 4, 2010, now Pat. No. Des. 643,580.

(51) LOC (10) Cl. ..... 30-04
(52) U.S. Cl.
USPC ..... D30/152
(58) Field of Classification Search
USPC ..... D30/152, 144, 151, 153, 154; 119/702, 119/712, 792–798, 758, 760, 769, 770, 784, 119/815, 818, 856, 863, 864, 905, 907, 802, 119/857, 865, 725, 771; D21/805, 804; D3/217, 327, 271.2; D29/101.1, 101.5, D29/101.3; D24/190; D34/28; 54/71
See application file for complete search history.

(56) References Cited

U.S. PATENT DOCUMENTS

| | | | | | |
|---|---|---|---|---|---|
| 1,508,601 | A | * | 9/1924 | Huff | 119/792 |
| 1,906,043 | A | * | 4/1933 | Bernstein | 119/856 |
| 2,187,021 | A | * | 1/1940 | Everson | 119/792 |
| 2,605,744 | A | * | 8/1952 | Urbanski | 119/863 |
| 4,597,359 | A | * | 7/1986 | Moorman | 119/28.5 |
| D293,139 | S | * | 12/1987 | Roa | D30/152 |

(Continued)

OTHER PUBLICATIONS http://www.overstock.com/Pet-Supplies/Majestic-Pets-Nylon-12-to-20-inch-Easy-Adjustable-Dog-Harness/3324654/product.html Majestic Pet Adjustable Dog Harness.

(Continued)

*Primary Examiner* — Phillip S Hyder
(74) *Attorney, Agent, or Firm* — Margaret Polson; Polson Intellectual Property Law PC

(57) CLAIM

The ornamental design for a dog harness, as shown and described.

DESCRIPTION

FIG. 1 is a bottom perspective view of my new design for a dog harness with the evenly dotted lines showing stitching[, which is part of the claimed design, and a snap hook and buckles in dot and dash lines which is for illustrative purposes to show where the leash can be attached and does not form part of the claimed design.];
FIG. 2 is a [right and] left side elevation view[, which are mirror images,] of FIG. 1[.], *wherein the right side elevation view is a mirror image;*
FIG. 3 is a front side elevation view of FIG. 1[.];
FIG. 4 is a [back] *rear* side elevation view of FIG. 1[.];
FIG. 5 is a top plan view of FIG. 1; and,
FIG. 6 is a bottom plan view of FIG. 1.
*The broken lines depict portions of the dog harness in which the design is embodied that are not considered part of the claimed design.*

1 Claim, 4 Drawing Sheets

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D310,435 | S | * | 9/1990 | Cleveland | D30/152 |
| 5,247,905 | A | * | 9/1993 | Arakawa | 119/863 |
| 5,370,083 | A | * | 12/1994 | Sporn | 119/864 |
| 5,427,061 | A | * | 6/1995 | McCullough | 119/771 |
| 5,471,953 | A | * | 12/1995 | Sporn | 119/792 |
| D366,542 | S | * | 1/1996 | Pierson | D30/152 |
| 5,611,298 | A | * | 3/1997 | Sporn | 119/792 |
| 5,676,093 | A | * | 10/1997 | Sporn | 119/792 |
| 5,794,571 | A | * | 8/1998 | Goldberg | 119/792 |
| 5,915,335 | A | * | 6/1999 | Holt, Jr. | 119/771 |
| D424,761 | S | * | 5/2000 | Mortenson | D30/152 |
| 6,101,979 | A | * | 8/2000 | Wilson et al. | 119/725 |
| D434,535 | S | * | 11/2000 | Koch | D30/152 |
| 6,161,505 | A | * | 12/2000 | Noguero | 119/792 |
| 6,164,245 | A | * | 12/2000 | Johnson | 119/712 |
| 6,213,057 | B1 | * | 4/2001 | Franco et al. | 119/793 |
| 6,314,915 | B1 | * | 11/2001 | Pope et al. | 119/712 |
| 6,450,130 | B1 | * | 9/2002 | Goldberg | 119/792 |
| 6,463,888 | B2 | * | 10/2002 | Clark | 119/856 |
| 6,694,923 | B1 | * | 2/2004 | Fouche | 119/792 |
| 7,107,939 | B2 | * | 9/2006 | Lady | 119/792 |
| 7,140,326 | B2 | * | 11/2006 | Jenny et al. | 119/770 |
| 7,165,511 | B1 | * | 1/2007 | Brezinski | 119/792 |
| 7,311,063 | B2 | * | 12/2007 | Goldberg | 119/771 |
| 7,357,099 | B2 | * | 4/2008 | Smith et al. | 119/771 |
| 7,387,087 | B2 | * | 6/2008 | Lady | 119/792 |
| D591,011 | S | * | 4/2009 | Madere et al. | D30/152 |
| 7,757,641 | B1 | * | 7/2010 | Worden | 119/856 |
| D632,850 | S | * | 2/2011 | Light et al. | D30/152 |
| 2004/0000273 | A1 | * | 1/2004 | Lady | 119/792 |
| 2004/0025804 | A1 | * | 2/2004 | Smith et al. | 119/792 |
| 2006/0112903 | A1 | * | 6/2006 | Zutis et al. | 119/792 |
| 2007/0266960 | A1 | * | 11/2007 | Mugford | 119/792 |
| 2008/0047501 | A1 | * | 2/2008 | Madere et al. | 119/863 |

OTHER PUBLICATIONS http://www.softouchconcepts.com/index.php/how-to-54/how-to-fit.

* cited by examiner

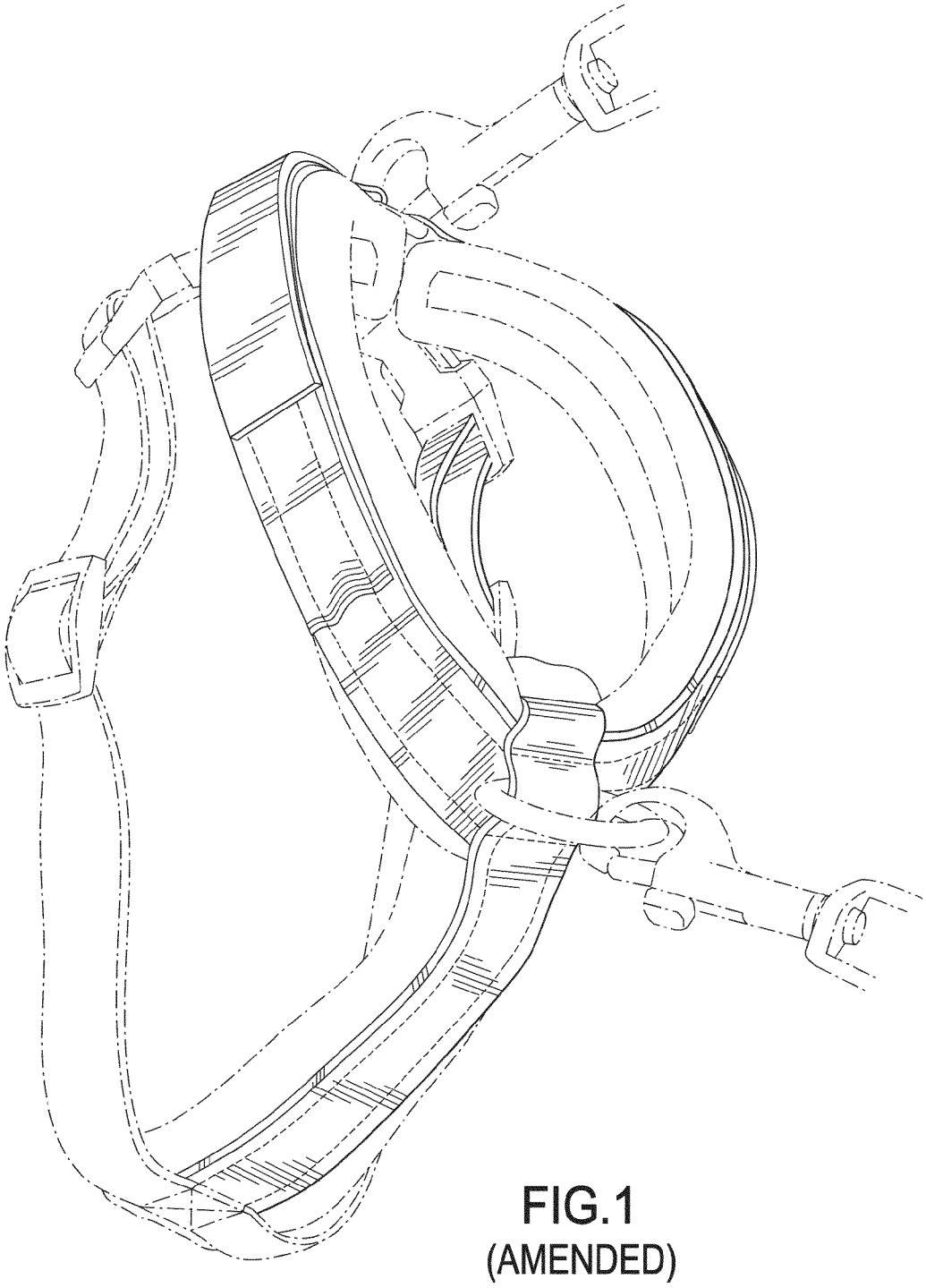
FIG.1
(AMENDED)

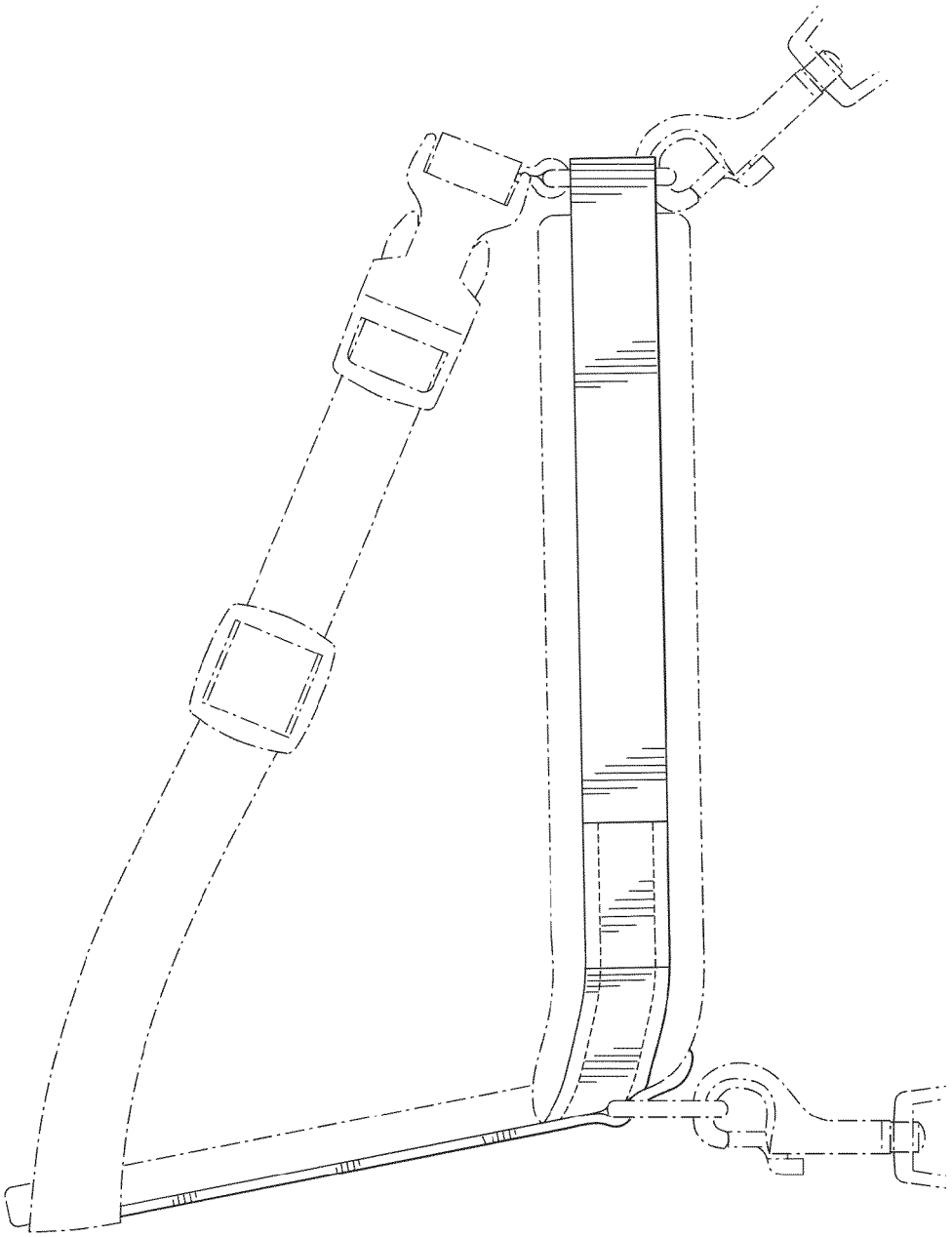
FIG.2
(AMENDED)

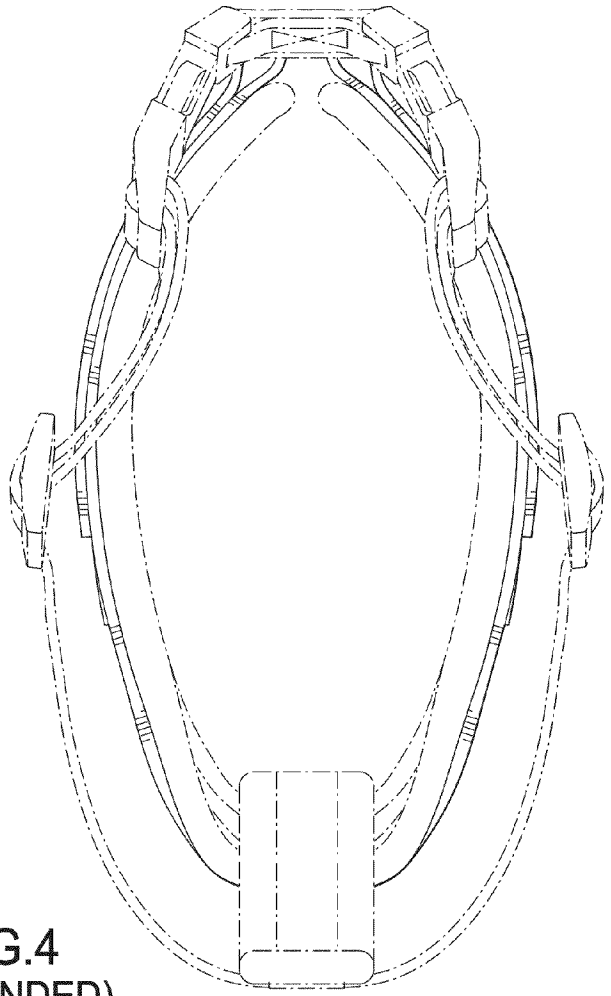
FIG.4
(AMENDED)
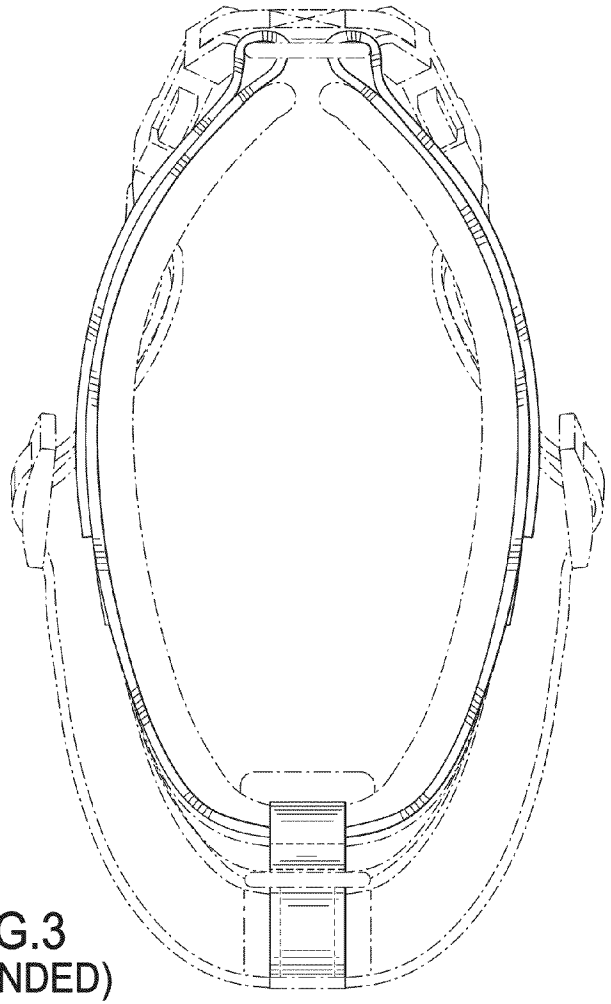
FIG.3
(AMENDED)

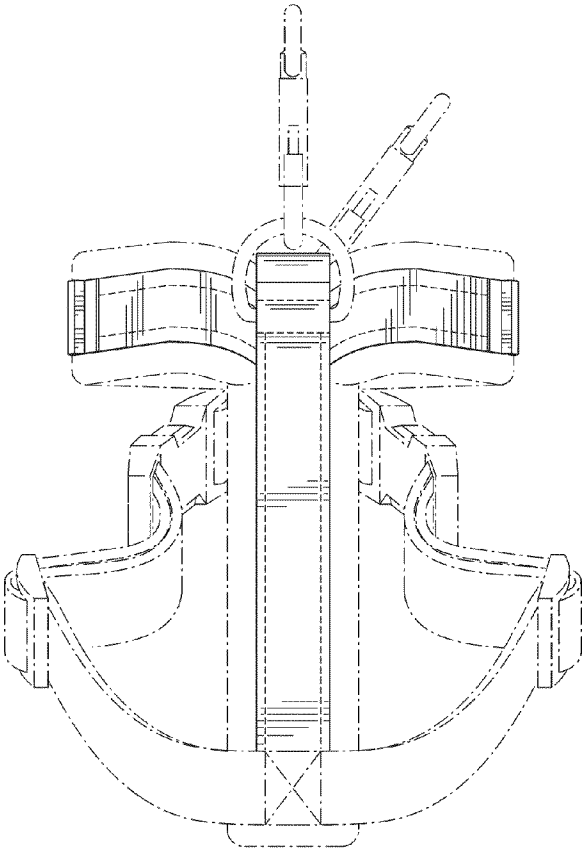
FIG.6
(AMENDED)
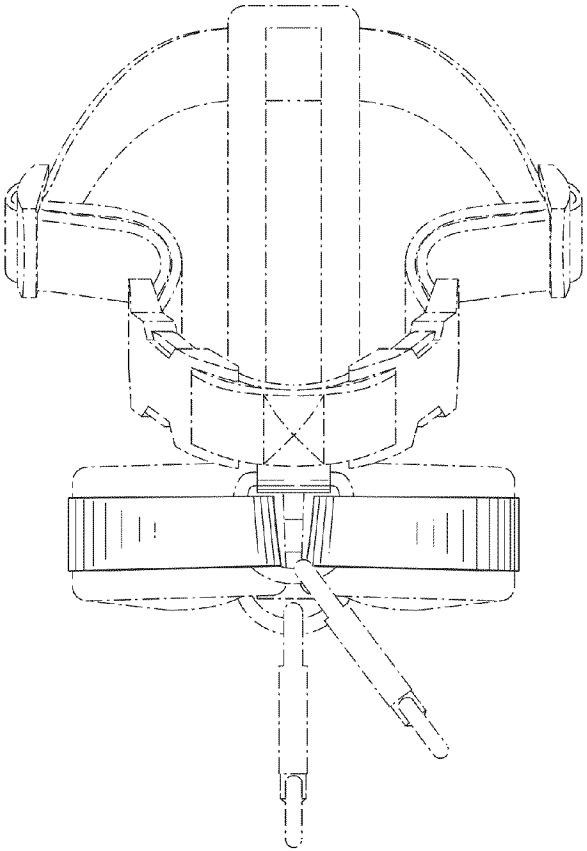
FIG.5
(AMENDED)